Oct. 17, 1950   G. A. TINNERMAN   2,525,977
FASTENING DEVICE
Original Filed Jan. 5, 1944

INVENTOR.
GEORGE A. TINNERMAN
BY
H. G. Lombard
ATTORNEY

Patented Oct. 17, 1950

2,525,977

UNITED STATES PATENT OFFICE 2,525,977

FASTENING DEVICE

George A. Tinnerman, Cleveland, Ohio, assignor to Tinnerman Products, Inc., Cleveland, Ohio, a corporation of Ohio Original application January 5, 1944, Serial No. 517,027. Divided and this application January 22, 1948, Serial No. 3,752

1 Claim. (Cl. 240—151)

This invention relates to fastening devices, and particularly to sheet metal structures which are adapted to provide a quick and easy assembly of parts to be secured together.

This application is directed to the general fastening combination and is a division of application Serial Number 517,027, filed January 5, 1944, which pertains to the fastening device per se and which has since issued as United States Patent Number 2,435,908, February 10, 1948.

The invention is useful in retaining a lens in position adjacent an opening in a plastic lamp housing and it has for an object the provision of a fastener which will attain such assembly without the necessity for the use of threaded or other extraneous fastening means.

The invention contemplates additionally a fastener which has a positive gripping action of the securing elements thereof with connecting studs that form part of the plastic housing or other support for the article to be attached thereto, and to insure an assembly which will not be loosened under extreme conditions of vibration.

Further objects and advantages, and other new and useful features in the construction, arrangement and general combination of parts will be readily apparent as the following description proceeds with reference to the accompanying drawings, for purposes of illustration but not of limitation, in which like reference characters designate like parts throughout, and in which.

Figure 1:
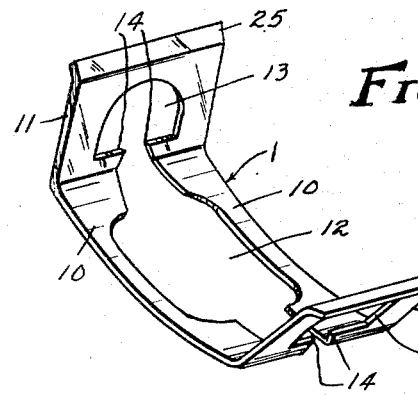
Fig. 1 is a perspective view of a fastener embodying the present invention.
Figure 2:
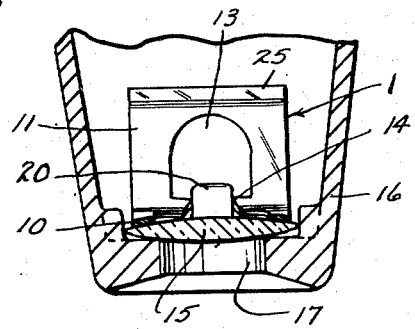
Fig. 2 is a section taken transversely through an assembly utilizing the fastener and particularly on a plane indicated by the line 2—2 in Fig. 3.
Figure 3:
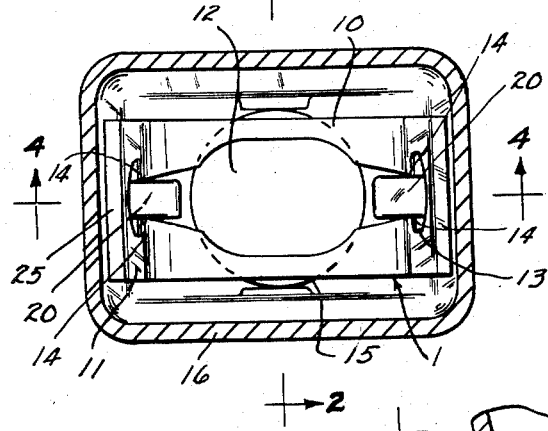
Fig. 3 is a section taken on a plane indicated by the line 3—3 in Fig. 4.
Figure 4:
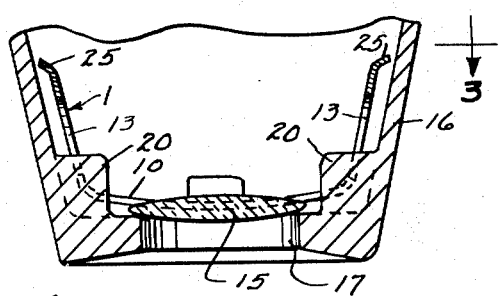
Fig. 4 is a section taken on a plane indicated by the line 4—4 in Fig. 3.

The fastener embodying the present invention is made from a strip of sheet metal 1 of generally U-shaped configuration with an opening 12 extending longitudinally thereof to divide it into spaced side sections 10. The arms of the U define end sections 11 and the opening in the strip extends up into the end sections and is enlarged therein, as at 13, and is shaped to define cooperating securing elements shown as fingers 14. The side sections 10 between the end sections are preferably arched in a longitudinal direction.

The fastener 1 is shown as operating to hold a lens 15 in place against the bottom of a plastic housing 16 adjacent an opening 17 therein, and the fastener is applied by pushing it with the side portions 10 foremost into the housing against the lens 15 until the fingers 14 engage spaced ribs 20 which project from the housing at opposite ends of the lens.

The opening 12 in the body of the fastener not only provides ample space for the transmittal of light through the lens, but also results in a construction wherein the side portions 10 are laterally yieldable sufficiently to permit the fingers to grip the sides of the ribs 20 and to be held thereagainst solely by tension inherent in the metal of which the fastener is made. The ribs are molded onto the housing, wherefore the connection may be made without the necessity of threaded fasteners, or the like.

To facilitate the assembly operation, the terminal portions 25 of the end sections are flared outwardly so that the fingers of an operator may exert pressure against the end sections to force them securely downwardly into contact of the elements 14 with the ribs 20. By making the space between each set of fingers 14 sufficiently wide to admit the associated rib 20 when the side portions are sprung apart, the inherent tendency of the side portions to resume their normal position is utilized to effect a secure grip upon the ribs 20.

While the invention is shown in connection with a lamp housing 16 as utilizable for retaining the lens 15 in place without the necessity for threaded fastening members, or without the need for embedding metallic fastening devices in the plastic material of which the housing is made, nevertheless, it is to be understood that the invention is not limited in its applicability to such assembly. The invention is suitable for use in retaining any two articles in assembled relationship, one of which carries projecting ribs or studs, solely by means of spring tension of the material of which the fastener is made, and by virtue of the shape thereof.

What is claimed is:

A housing for a lens comprising a cup-like element with a lens receiving aperture in the bottom thereof, diametrically opposed lugs integrally formed on the inner wall of said cup-like element on opposite sides of said aperture, said lugs being engaged by a spring clip having an aperture for exposing a portion of said lens, and end portions on said clip comprising elements gripping opposite sides of said lugs for holding the lens in position.

GEORGE A. TINNERMAN.

REFERENCES CITED

The following references are of record in the file of this patent:

UNITED STATES PATENTS

| Number | Name | Date |
|---|---|---|
| 1,685,575 | Springer | Sept. 25, 1928 |
| 1,760,261 | Walters | May 27, 1930 |
| 2,247,975 | Tinnerman | July 1, 1941 |
| 2,251,723 | Tinnerman | Aug. 5, 1941 |
| 2,327,327 | Maynard | Aug. 17, 1943 |
| 2,388,650 | Whittell | Nov. 6, 1945 |
| 2,428,631 | Millette | Oct. 7, 1947 |
| 2,435,908 | Tinnerman | Feb. 10, 1948 |